(12) United States Patent
Christiansen (10) Patent No.: US 12,173,686 B2
(45) Date of Patent: Dec. 24, 2024

(54) FLOATING WIND TURBINE COMPRISING AN INTEGRATED ELECTRICAL SUBSTATION

(71) Applicant: EnBW Energie Baden-Württemberg AG, Karlsruhe (DE)

(72) Inventor: Udo Christiansen, Pansdorf (DE)

(73) Assignee: EnBW Energie Baden-Württemberg AG, Karlsruhe (DE)

( * ) Notice: Subject to any disclaimer, the term of this patent is extended or adjusted under 35 U.S.C. 154(b) by 0 days.

(21) Appl. No.: 17/635,893

(22) PCT Filed: Jul. 29, 2020

(86) PCT No.: PCT/EP2020/071337
§ 371 (c)(1),
(2) Date: Feb. 16, 2022

(87) PCT Pub. No.: WO2021/032422
PCT Pub. Date: Feb. 25, 2021

(65) Prior Publication Data
US 2022/0299011 A1    Sep. 22, 2022

(30) Foreign Application Priority Data

Aug. 16, 2019  (DE) .................... 10 2019 122 110.2

(51) Int. Cl.
*F03D 13/25*   (2016.01)
*H02B 7/00*    (2006.01)
*H02K 7/18*    (2006.01)

(52) U.S. Cl.
CPC .............. *F03D 13/25* (2016.05); *H02B 7/00* (2013.01); *H02K 7/183* (2013.01); *F05B 2240/93* (2013.01)

(58) Field of Classification Search
CPC ........... F03D 13/25; F03D 80/82; H02B 7/00; H02K 7/183; F05B 2240/93; F05B 2240/95; Y02E 10/72; Y02E 10/727
See application file for complete search history.

(56) References Cited

U.S. PATENT DOCUMENTS

| | | | |
|---|---|---|---|
| 2010/0194115 | A1 | 8/2010 | Jakubowski |
| 2011/0037264 | A1 | 2/2011 | Roddier et al. |
| 2015/0375832 | A1 | 12/2015 | Su |

FOREIGN PATENT DOCUMENTS

| | | |
|---|---|---|
| CN | 101981306 A | 2/2011 |
| CN | 102015435 A | 4/2011 |
| CN | 102362068 A | 2/2012 |
| CN | 105073573 A | 11/2015 |
| CN | 107208608 A | 9/2017 |
| DE | 102004063508 A1 | 7/2006 |
| DE | 102009017468 A1 | 10/2010 |
| DE | 102010035024 A1 | 2/2012 |
| DE | 202014004372 U1 | 8/2014 |

(Continued)

OTHER PUBLICATIONS

Translated JP OA, mailing date Jan. 31, 2023. pp. 1-5.
International National Search Report and Written Opinion for PCT/EP2020/071337, filed Jul. 29, 2020. Mailing Date of Search Report Nov. 2, 2020. pp. 1-10.
Examination Report of German Application 102019122110.2, filed Aug. 16, 2019.

(Continued)

*Primary Examiner* — Joseph Ortega
(74) *Attorney, Agent, or Firm* — BOND, SCHOENECK & KING, PLLC; George R. McGuire (57) ABSTRACT

The invention relates to a wind turbine having an integrated electrical substation, and to a floating offshore wind farm which are optimized in terms of capital costs, economic efficiency, and installation space requirements.

14 Claims, 6 Drawing Sheets

(56) References Cited

FOREIGN PATENT DOCUMENTS

| | | | |
|---|---|---|---|
| DE | 102018210623 A1 | 1/2020 | |
| EP | 2221474 A1 | 8/2010 | |
| EP | 2426353 B1 | 4/2013 | |
| EP | 2811159 A1 | 12/2014 | |
| EP | 2811160 A1 | 12/2014 | |
| GB | 2599166 A * | 3/2022 | ......... E21B 33/0385 |
| NZ | 565632 A | 4/2009 | |
| TW | 201930716 A | 8/2019 | |
| WO | 2019106283 A1 | 6/2019 | |
| WO | 2019137639 A1 | 7/2019 | |
| WO | WO-2020001932 A1 * | 1/2020 | |

OTHER PUBLICATIONS

International Preliminary Report on Patentability, dated Jun. 16, 2021. pp. 1-13.
Canadian Office Action, Application No. 3140738, PCT No. EP2020071337, dated Jan. 17, 2023, pp. 1-8.
Taiwanese Office Action, dated Jul. 7, 2023, pp. 1-1.
Translated Chinese Office Action, App. No. 202080051970.8, dated Oct. 19, 2023, pp. 1-16.
New Zealand Office Action, App. No. 783421, dated Oct. 16, 2023, pp. 1-5.
Canadian Office Action, Application No. 3,140,738, dated Apr. 3, 2024, pp. 1-5.
German Office Action, Application No. 102019122110.2, dated May 7, 2024, pp. 1-8 with pp. 1-4 being a translation., 1-8.
Translated Chinese Office Action, Application. No. 202080051970.8, dated Jul. 3, 2024, pp. 1-8.

\* cited by examiner

FLOATING WIND TURBINE COMPRISING AN INTEGRATED ELECTRICAL SUBSTATION

CROSS REFERENCE TO RELATED APPLICATIONS

This is a National Stage Application filed under 35 U.S.C. 371 based on International Patent Application No. PCT/EP2020/071337, filed on Jul. 29, 2020, which claims priority to German Patent Application 10 2019 122 110.2 filed Aug. 16, 2019. The entire disclosures of each of the foregoing are hereby incorporated herein by reference in their entireties.

BACKGROUND

The invention relates to a floating wind turbine, to the integration thereof in what is known as a floating offshore wind farm, and to a floating offshore wind farm. The term "floating offshore wind farm" includes all offshore wind farms of which the wind turbines are not firmly connected to the seabed by means of a foundation structure, but rather are supported by one or more hollow bodies; this arrangement of hollow bodies is also referred to as a "floating foundation" within the context of the invention. In order to prevent the wind turbines from drifting on the floating foundations, they are connected to the seabed by means of ropes or chains.

Each offshore wind farm is associated with at least one electrical substation which collects the electrical energy generated by the wind turbines and transforms said electrical energy to a voltage suitable for "transport" to the mainland. For example, the voltage can be increased from 66 kV to 230 kV in order to reduce line losses and the required cross sections of sea or export cables. It is also common practice to provide a reactive current compensation apparatus for the export cables in the electrical substation. This apparatus, also referred to below as a "reactive current compensator," is considered to be part of the electrical substation in the context of the invention.

FIG. 1 of DE 20 12104 004 372 U1 describes the topology of an offshore wind farm in which the wind turbines are grounded and secured with foundations in the seabed. An electrical substation is integrated in one of the foundations. The electrical substations of the wind farm are joined directly to the onshore transmission network by high-voltage three-phase cables or to a converter station which allows the electrical energy to be transmitted to the mainland using high-voltage direct current. A separate foundation is provided for the converter station.

A relatively complex floating foundation is known from WO 2019/106283 A1, the hollow bodies of which form a ring. Far below this ring there is a non-buoyant ballast weight that is connected to the floating foundation via ropes or chains. The invention described below can also be carried out using such a floating foundation.

SUMMARY OF THE INVENTION

The invention has the object of providing a floating wind turbine with extended functionality. The use of the wind turbine according to the invention is intended to reduce the capital costs of a floating offshore wind farm without impairing the availability and the annual electricity generation of the wind farm. In addition, a floating offshore wind farm which requires less space but has the same power generation is intended to be provided.

According to the invention, this object is achieved by a wind turbine comprising a tower, a nacelle arranged on the tower, and a floating foundation, the floating foundation comprising at least one buoyant hollow body, in that an electrical substation including a reactive current compensation apparatus, or at least parts of an electrical substation, is or are installed in the hollow body or bodies of the floating foundation.

The invention makes use of the characteristic of wind turbines having a floating foundation that the hollow body or bodies of the floating foundation have a considerable volume. In conventional floating foundations, the hollow body or bodies are partly filled with ballast water. However, the greater part of the volume of the hollow body is filled with air in order to provide the necessary buoyancy force. According to the invention, this volume is used as installation space for a large-sized electrical substation including a reactive current compensation apparatus.

This results in a considerable economic advantage; a separate structure just for the electrical substation is not necessary. This significantly reduces the overall costs of the floating offshore wind farm. In addition, if the offshore wind farm is a certain size, instead of the electrical substation being installed on a separate floating foundation, an additional wind turbine comprising an integrated electrical substation can be operated. As a result, the annual electricity generation of the wind farm increases significantly while still taking up the same area.

It has proven to be advantageous if the essential components, in particular the heavy components of the electrical substation, such as the transformer and reactive current compensation coil, are installed in a region of the hollow body that is below the water level during operation, i.e., when the wind turbine is floating. This is because the center of gravity of the wind turbine can then be shifted downward. As a result, the metacentric height of the wind turbine is increased, and the stability of the floating wind turbine is improved. In addition, the amount of ballast water required can be reduced or, ideally, there is no need for ballast water at all in this hollow body. The complete elimination of ballast water in a hollow body further simplifies the integration of an electrical substation.

In a further advantageous embodiment of the invention, the regions of the hollow body or bodies that are below the surface of the water during operation are designed as cooling surfaces. These cooling surfaces are used to cool the transformer and/or the reactive current compensation coil. It is possible, for example, for the hollow body to be designed as a two-shell wall in some regions and for cooling water to circulate between the two shells of this wall to cool the above-mentioned stations. The cooling water is cooled by the surrounding seawater through the outer wall of the hollow body and can thus efficiently dissipate the waste heat generated during operation of the transformer or the reactive current compensation coil.

In a consistent development and within the meaning of an even more functional integration, parts of the hollow body or bodies can be used to encapsulate parts of or all of the electrical substation. For example, it is conceivable that the hollow body is designed to encapsulate the transformer and the reactive current compensation coil of the electrical substation. Then the wall of the hollow body is also used as a cooling surface such that the waste heat generated at the transformer and the reactive current compensation coil of the electrical substation is transmitted directly to the surrounding seawater via the transformer oil and the wall of the hollow body. A separate cooling water circuit can be omitted.

In a preferred embodiment, the wall of the hollow body is made of metal, preferably steel, such that this wall simultaneously forms the electrical shielding of the components of the electrical substation. This also saves further construction costs, and therefore the profitability of the wind turbine or the wind farm is further increased.

In a further advantageous embodiment, a plurality of separately controllable power switches is arranged on the input side of the electrical substation. A strand of the wind farm according to the invention is connected to each of these power switches. The wind turbines on a strand do not have any separate switching apparatuses, but rather are switched centrally, as it were, via the controllable power switches on the input side of the electrical substation. This means that the wind turbines integrated in a strand do not have their own switching apparatuses. All wind turbines in a strand are switched centrally via a power switch associated with this strand in the wind turbine having an integrated electrical substation.

An offshore wind turbine is known from the subsequently published WO 2020/001932 A1, in which the parts of an electrical substation are used as ballast.

This results in overall costs for the other wind turbines being further reduced. For example, only one switching apparatus is required for a strand having three wind turbines. In practice, this results in a slightly reduced availability, since in the event of a possible cable fault, all of the wind turbines in a strand will fail. In comparison to the turbines known from the prior art, however, only three fail, rather than up to ten. Specifically, this means that, for example, two functioning wind turbines will be taken out of operation for a short time, although this would not be technically necessary. However, the cost savings due to the omission of any power switches in the wind turbines and the use of smaller cable cross sections are greater than the slightly reduced availability of these two wind turbines. The maintenance of all wind turbines of a strand could take place at the same time.

In the turbines known from the prior art having up to 10 turbines in a strand and switch panels in each wind turbine, there is a risk that if the cable is faulty directly at the electrical substation, all ten turbines will fail. Having the power switches in the wind turbines confers no advantage.

In a further embodiment of the invention, the floating foundation comprises a plurality of hollow bodies. The switch system for the farm cabling and the transformer are integrated in a first hollow body and the reactive current compensation coil and the switch panel for the export cable are integrated in a second hollow body. The hollow bodies are connected to one another by struts. These struts are tubes and can be used to guide lines between the transformer and the high-voltage switch panel. This results in further cost reduction and functional integration.

In a further embodiment of the invention, the hollow body or the hollow bodies which accommodate the electrical substation have installation openings. These openings can be closed in a watertight manner and are dimensioned in such a way that the components of the electrical substation can be lifted into the hollow body through the openings.

These openings are arranged at a height above sea level so that they can be easily reached by ship. It is also possible to attach a crane or other lifting device to the tower or the floating foundation such that the components of the electrical substation can be lifted into or out of the hollow body using the lifting device.

The object mentioned at the outset is also achieved in a floating offshore wind farm, consisting of a large number of wind turbines which are connected via electrical lines to at least one electrical substation located offshore, in that one of the wind turbines is a wind turbine comprising an integrated electrical substation and/or comprising an integrated reactive current compensator according to any of the preceding claims, and in that the plurality of wind turbines of the wind farm is joined to the electrical substation of the wind turbine comprising an integrated electrical substation. The wind turbine, the foundation of which houses the electrical substation, can be joined to one of the strands or alternatively "individually" joined to the electrical substation.

According to the invention, only so many of the surrounding wind turbines are connected to an electrical substation that the connection can be made using a uniform and relatively small cable cross section. For example, three, four or five wind turbines can be joined to an electrical substation. This is a departure from the practice known from the prior art of combining as many wind turbines as possible (10 or more) into one strand in order to minimize the number of cables to be joined to the electrical substation. This practice has the disadvantage that the cross sections of the cable become larger the closer they are to the electrical substation in order to be able to transmit the higher power. Cables having a large cross section are more expensive, heavier, and more difficult to install. In the turbines known from the prior art, up to three different cable cross sections are used. This increases the cost of stocking spare parts.

According to the invention, all wind turbines in a wind farm are joined to a plurality of electrical substations using only one cable cross section due to a plurality of strands having a few wind turbines. The electric lines which are made of aluminum and suitable for this purpose are relatively light and inexpensive. This further contributes to the increased profitability of the offshore wind farm according to the invention.

In the case of high-power offshore wind farms, there is a plurality of small electrical substations according to the invention in an offshore wind farm, the relatively small electrical substations being integrated into the hollow bodies of one or more wind turbines. There they are protected from the weather. Additional structures on the foundation may have an impact on the wind turbine and thus also on the generation of energy. It is therefore advantageous according to the invention to integrate the electrical substation directly into the foundation and to use the very large installation space available within the hollow body.

Because the electrical substation according to the invention can be dimensioned so as to be sufficiently large and the location of a wind turbine does not have to be "sacrificed," the location of the electrical substation can be optimally selected with regard to power, connection of the wind turbines and export cables. This results in considerable synergy effects.

In an advantageous embodiment of the floating offshore wind farm according to the invention, only a few wind turbines are connected to a strand and each strand is joined to one of the power switches of the wind turbine comprising an integrated electrical substation. The wind turbines are preferably connected to form a strand in such a way that, if possible, all cables used in the floating offshore wind farm have the same relatively small conductor cross section.

In a further advantageous embodiment, just as many wind turbines are joined to the electrical substation that only one high-voltage export cable and thus only one transformer and one reactive current compensation coil are used. Currently, depending on the distance to the mainland, the nature of the seabed and other parameters, this means that between 300 and 250 MW can be transmitted over a high-voltage export cable.

Further advantages and advantageous embodiments of the invention can be found in the following drawings, the description thereof and the claims. All of the features described in the drawings, the description thereof and the claims can be essential to the invention both individually and in any combination with one another.

DESCRIPTION OF THE EMBODIMENTS

Figure 1:
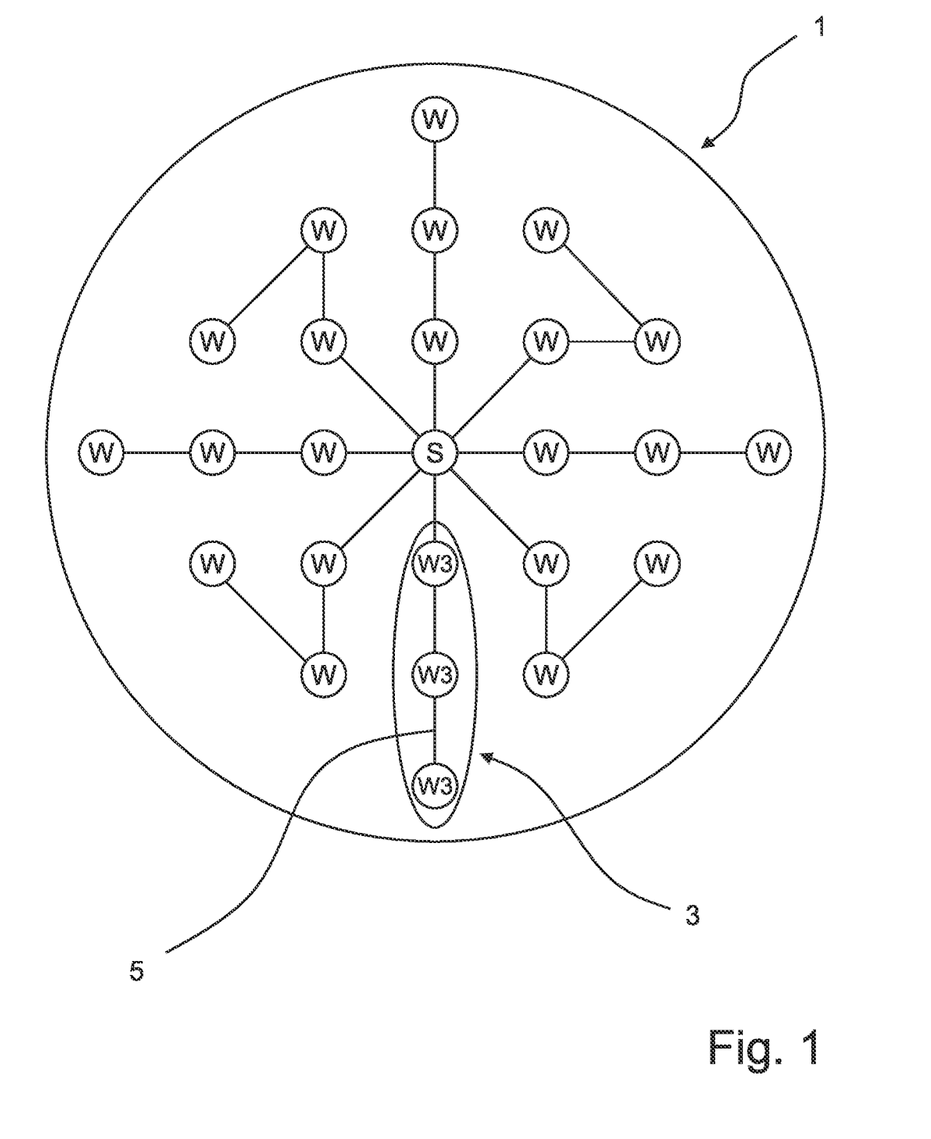
FIG. 1 shows the topology of a floating offshore wind farm according to the invention.

A floating offshore wind farm 1 according to the invention is shown schematically and in a greatly simplified manner in FIG. 1. This wind farm 1 comprises a large number of wind turbines W.

The wind turbine S comprising an integrated electrical substation 14 differs from the other wind turbines W in that an electrical substation 14 is integrated into the foundation of the wind turbine S. The details of this integration are explained in more detail below with reference to FIG. 2 to 5. In the context of the invention, it should be noted that in each case three wind turbines W are combined to form a strand 3. Each strand 3 ends in the wind turbine comprising an integrated electrical substation S. The electrical interconnection of the individual strands or the wind turbines W on a strand is explained in more detail below.

The number of wind turbines W on a strand 3 is less than 5; in the example shown, it is equal to 3. All strands 3 lead into the wind turbine S comprising an integrated electrical substation and are switched on and off separately there. Details regarding this can be found in FIG. 3 and are explained in more detail in connection with FIG. 6.

The electrical energy generated by these wind turbines W is transported to the electrical substation 14 of the wind turbine S comprising an integrated electrical substation via a cable 5 which connects the wind turbines W of a strand 3 to one another. By way of example, the wind turbines of a strand 3 are referred to as W1, W2 and W3 in FIG. 1.

The electrical energy generated by the wind turbines W1, W2 and W3 is transported to the electrical substation 14 inside the wind turbine S via a common cable 5. Therefore, they can only be put into operation or taken out of operation together. If, for whatever reason, the power switch 19, which is associated with a strand and is in front of the electrical substation 14 of the wind turbine S, is open, then all three wind turbines W1, W2 and W3 of the affected strand 3 no longer supply any electrical energy to the electrical substation 14 in the wind turbine S.

This supposed "disadvantage" actually leads to a considerable economic advantage because the number of power switches can be drastically reduced. Only one power switch 19 has to be provided in the electrical substation 14 per strand 3 and not, as in conventional wind farms, one power switch per strand 3 and a multi-panel switchgear per wind turbine W. This results in considerable cost advantages. Because no power switches have to be accommodated in the foundations or the towers of the wind turbines W, the probability of failure of the wind turbines is reduced.

The number of wind turbines on a strand 3 is less than 5. As a result, the line cross section of the cables 5 of a strand 3 can still be relatively small, and light, inexpensive, yet powerful aluminum cables can be used.

Since the wind turbines W generally do not fail unexpectedly but are only serviced in the sense of preventive maintenance, it is easily possible to shut down all wind turbines W of a strand 3 at the same time and to carry out maintenance on all turbines of a strand at the same time. The downtimes caused by maintenance therefore remain the same, although only one power switch is used per line.

Figure 2:
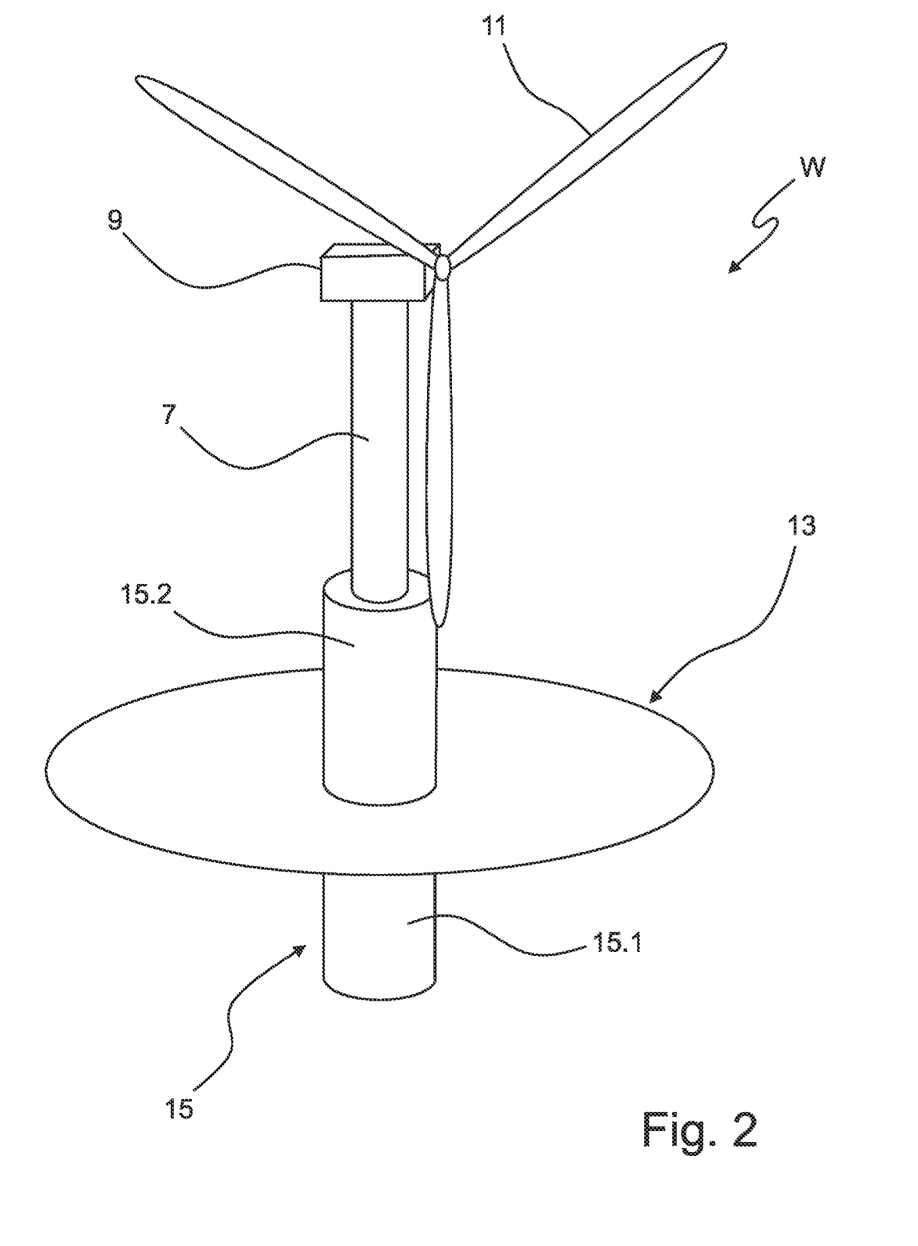
FIG. 2 shows a wind turbine having a Spar Buoy floating foundation.
Figure 3:
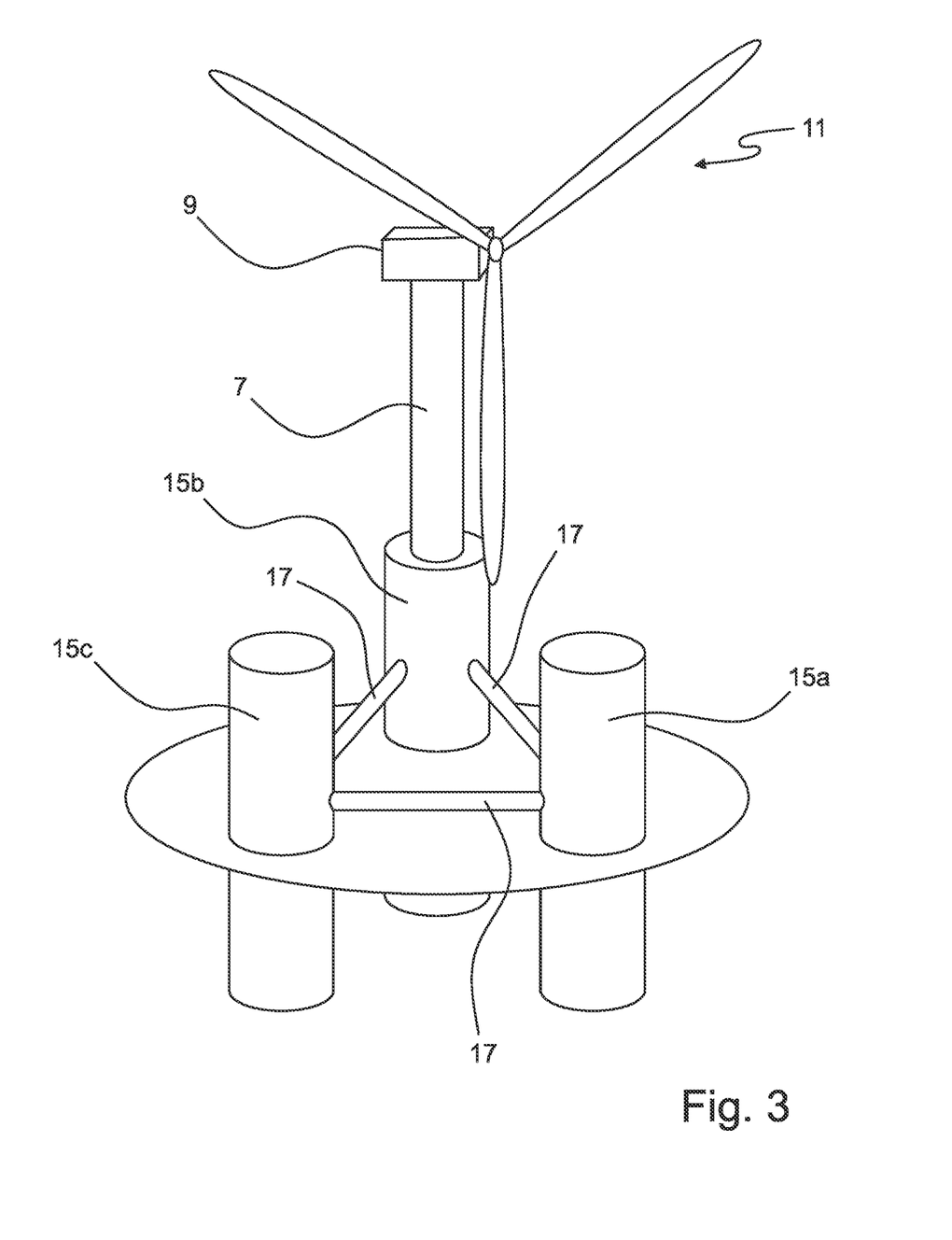
FIG. 3 shows a wind turbine having a semi-submersible floating foundation.

In FIGS. 2 and 3, two different types of wind turbines W having a floating foundation are shown in a greatly simplified manner. The wind turbine W comprises a tower 7 and a nacelle 9. The generator driven by the rotor 11 is arranged in the nacelle 9. At the foot of the tower 7, said tower is connected to a floating foundation 13.

FIG. 2 shows a Spar Buoy floating foundation. This type of floating foundation 13 comprises an elongate hollow body 15. The region of the hollow body 15 that is located below the surface of the water is referred to as 15.1. A small part 15.2 of the hollow body 15 is located above the surface of the water.

In FIG. 3, a second embodiment of a wind turbine having a floating foundation 13 is shown as an example of all semi-submersibles. In this embodiment, three hollow bodies 15a, 15b and 15c are connected to form a triangle using tubular struts 17. The wind turbine comprising the tower 7, nacelle 9 and rotor 11 is installed on one of the hollow bodies, specifically the hollow body 15b. The hollow bodies 15a, 15b and 15c do not have to have the same dimensions and geometries.

All hollow bodies 15, 15a, 15b and 15c have a very large volume, since they not only bear the weight of the wind turbine W, but also because they accommodate considerable amounts of ballast water in order to stabilize the wind turbine W.

Figure 4:
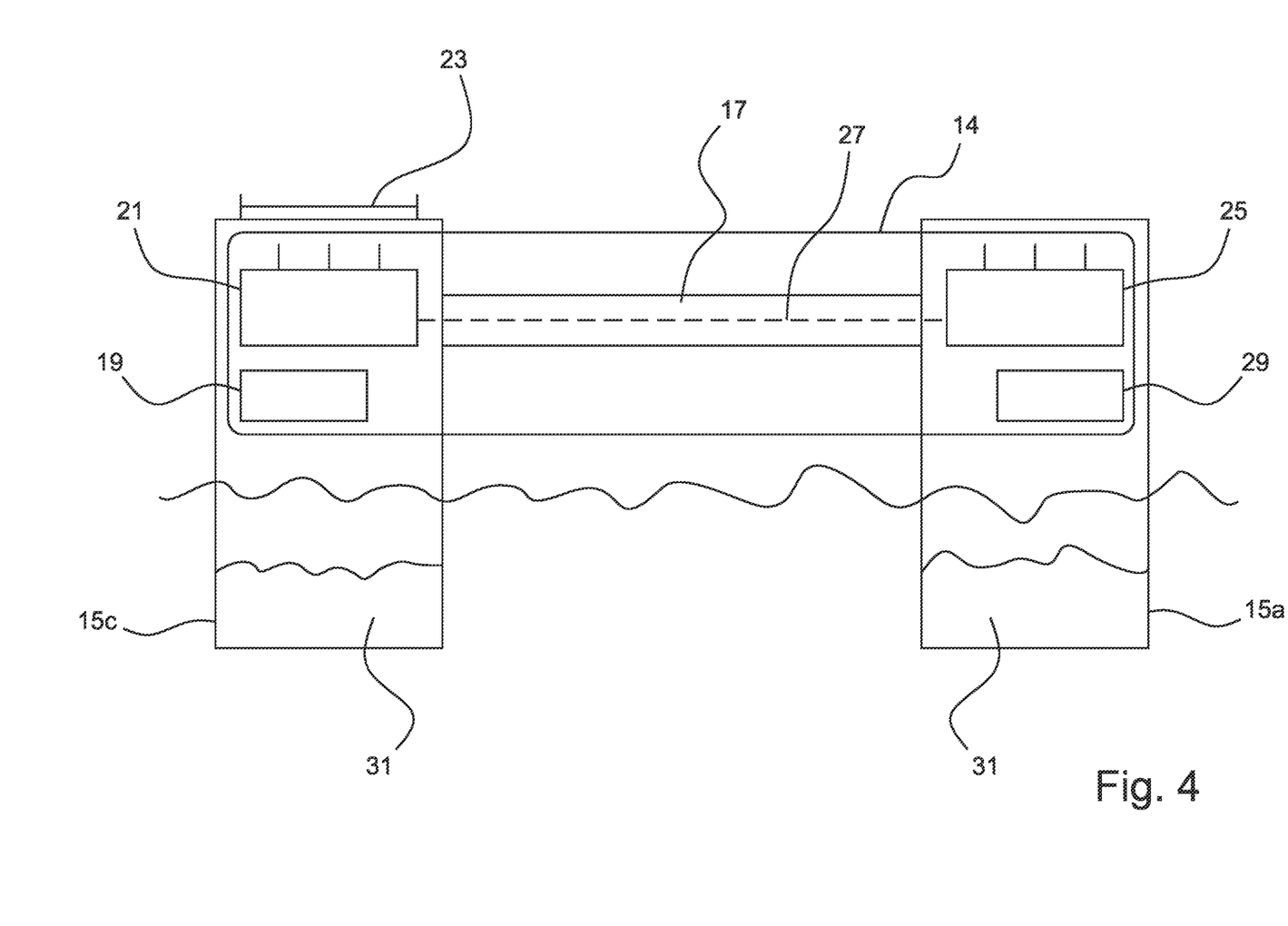
FIG. 4 shows a cross section through a wind turbine according to the invention comprising an integrated electrical substation in a side view.

FIG. 4 shows the two hollow bodies 15a and 15c from FIG. 3 in section and in a greatly simplified manner. In the hollow body 15c, various power switches 19 are shown in simplified form as a block. As already mentioned in connection with FIG. 1, there is a power switch for each strand 3, by means of which the electrical connection between a strand 3 and the downstream transformer 21 can be interrupted or created.

The cables 5 of the strands 3 and an electrical connection line between the power switches 19 and the transformer 21 are not shown in FIG. 4 since they are only a schematic illustration of the inventive concept.

A closable assembly opening 23 is provided on the top of the hollow body 15c. The assembly opening 23 is dimensioned such that the largest component (that is usually the transformer 21 and the reactive current compensation coil 25) of the electrical substation 14 can be lifted through the assembly opening 23 into the hollow body 15c. In the event of repair or replacement, all components of the electrical substation 14 can be inserted through the assembly opening 23 into the hollow body 15c and lifted out again if necessary.

A strut 17 is shown as an example between the hollow body 15c and the hollow body 15a. This strut 17 is designed as a tube so that it can simultaneously be used as a cable conduit for the cables 27 which connect the transformer 21 to the high-voltage switch panel 29.

The reactive current compensator 25 is connected to the high-voltage export cable via a high-voltage switch panel 29.

The electrical energy generated in the wind farm 1 is transmitted to the mainland via this high-voltage cable at a voltage of, for example, 230 kV.

The amount of ballast water 31 in the hollow bodies 15 is dimensioned such that the floating foundation 13 has sufficient depth and sufficient inertia to ensure a stable position of the wind turbine W which is mounted on the floating foundation 13. The integration according to the invention of an electrical substation 14 in one or more hollow bodies 15 of the floating foundation 13 increases the mass within the hollow bodies 15 and the amount of ballast water 31 can be reduced accordingly.

It is also possible to completely omit ballast water from the hollow body 15c, 15b in which the electrical substation 14 is located.

In contrast to what is shown in the simplified illustration in FIG. 4, the internal components according to the invention, such as the power switch 19, transformer 21 and reactive current compensator 25, can also be installed in hollow bodies 15 below the waterline. This results in a lower position of the center of gravity and consequently a greater metacentric height, which increases the floating stability of the foundation 13.

The lower regions 15.1 of the hollow body 15, which are immersed in the sea water, are cooled by the sea water such that the waste heat generated in the electrical substation 14 can partly be dissipated directly into the sea water via the outer walls of the hollow body 15. The hollow body 15 can also be designed in such a way that it simultaneously encapsulates the electrical substation or the transformer 21 and/or the reactive current compensation coil 25. A direct heat exchange between the transformer oil of the transformers 21, the reactive power compensation coil 25 and the seawater is then made possible, so to speak, without an additional component. The construction costs are reduced, and very effective heat dissipation is guaranteed.

Figure 5:
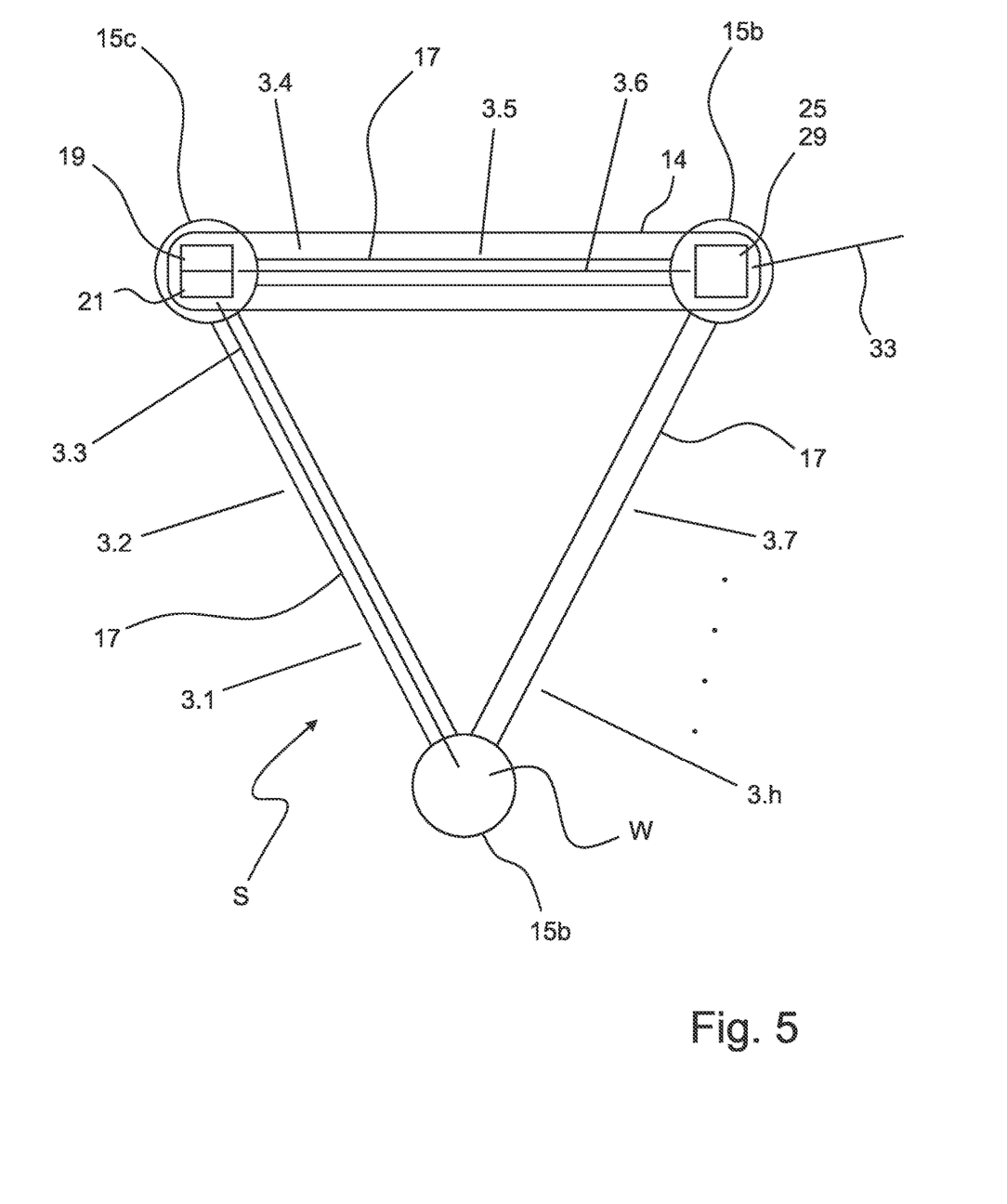
FIG. 5 shows the embodiment according to FIG. 4 in a view from above.

In FIG. 5, the view of the embodiment according to FIG. 3 is shown again from above. From this, the distribution of the various components, specifically the wind turbine W and electrical substation 14 comprising the transformer 21, power switches 19, reactive current compensator 25 and high-voltage switch panel 29, to the three hollow bodies 15a, 15b and 15c can be clearly seen.

It is clear from this illustration that the strands 3.1 to 3.n are guided to the wind turbine S comprising an integrated electrical substation 14. A high-voltage line 33 is shown at the output of the reactive current compensation coil 25. The electrical energy generated in the wind farm 1 is transported to the mainland via said line.

Figure 6:
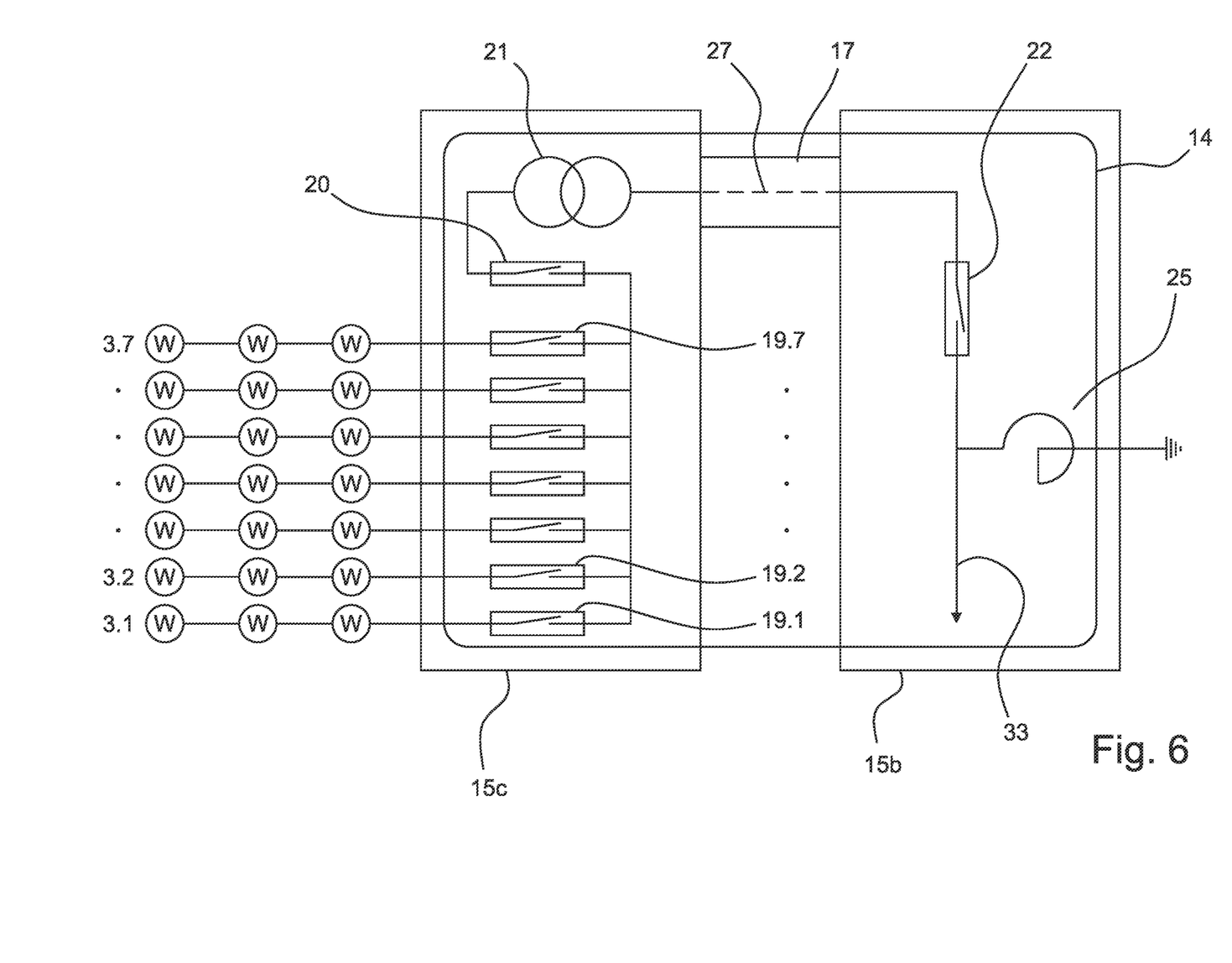
FIG. 6 shows the details of the electrical circuit of the embodiment according to FIGS. 4 and 5.

The electrical components in the hollow bodies 15c and 15b and their electrical connection are shown in somewhat greater detail in FIG. 6. In the hollow body 15c, a total of seven strands 3.1 to 3.7, each comprising three wind turbines W, are connected to the switch system 19. In addition, a main switch 20 is also provided that can connect or disconnect the input side of the transformer 21 to or from the switch panel 19 of the strands 3.1 to 3.7.

The electrical substation 14 comprises a transformer which transforms the electrical energy generated by the wind energy plants to 230 kV. This alternating current is conducted to the high-voltage switch panel 29 via the cable 27. The control panel 29 is used to connect and disconnect the high-voltage export cable and at the same time to connect the reactive current compensation coil 25 to the export cable 33.

The invention claimed is:

1. A wind turbine comprising at least one rotor and a floating foundation, wherein the floating foundation comprising at least one floating hollow body, wherein the floating foundation comprising an electrical substation installed in the hollow body of the floating foundation, wherein the electrical substation installed in the hollow body at least comprises a transformer having an input side, wherein the floating foundation comprising a plurality of controllable power switches coupled to an input side of a main switch, wherein the plurality of controllable power switches are adapted and configured to connect a high voltage from a cable that connects two or more wind turbines in a strand with the input side of the main switch and to disconnect the high voltage from the cable from the input side of the main switch, and the main switch is provided between the transformer and the plurality of controllable power switches, the main switch is adapted to connect or disconnect the input side of the transformer to or from the plurality of controllable_power switches.

2. The wind turbine according to claim 1, wherein the electrical substation are installed in the regions of the hollow body or bodies that are below the surface of the water.

3. The wind turbine according to claim 1, wherein the regions of the hollow body that are below the surface of the water during operation are designed as a cooling surface, and in that the cooling surfaces are used to cool a transformer and/or a reactive current compensation coil.

4. The wind turbine according to claim 1, wherein parts of the hollow body are designed to encapsulate part of a high-voltage electrical assemblies of the electrical substation.

5. The wind turbine according to claim 1, wherein the hollow body is made of metal and shield electrical components of the electrical substation.

6. The wind turbine according to claim 1, wherein the floating foundation comprises one or more hollow bodies, the transformer and the power switch for strands arranged in the hollow body receiving the electrical substation being a first hollow body and a reactive current compensation coil and a high-voltage switch panel arranged in a second hollow body, in that the first hollow body and the second hollow body are connected to one another by one or more struts, and in that cables which electrically connect the transformer and the high-voltage switch panel are laid in at least one of the struts.

7. The wind turbine according to claim 1, wherein the hollow body receiving the electrical substation and/or the hollow body receiving a reactive current compensation coil have closable openings, and in that these openings are above the surface of the water.

8. The wind turbine according to claim 7, wherein a closable opening is at least one meter above the surface of the water.

9. The wind turbine according to claim 1, wherein each rotor is mounted in a nacelle that is arranged on a tower.

10. The wind turbine according to claim 1, wherein an axis of rotation of the rotor or rotors extends horizontally or vertically.

11. The wind turbine according to claim 1, wherein the rotor has one wing, two wings or three wings, a Darrieus rotor or a Savonius rotor, or is a wind energy kite.

12. A floating offshore wind farm, consisting of at least two wind turbines which are connected via electrical lines/cables to at least one electrical substation located offshore, wherein one of the wind turbines is a wind turbine comprising at least one rotor and a floating foundation, the floating foundation comprising at least one floating hollow body, wherein the floating foundation comprising an integrated electrical substation installed in the hollow body, wherein the electrical substation, the electrical substation installed in the hollow body at least comprise a transformer having an input side, wherein the floating foundation comprising a plurality of controllable power switches coupled to the input side a main switch, wherein the plurality of controllable power switches are configured to connect a high voltage from a cable that connects two or more wind turbines in a strand with the input side of the transformer and to disconnect the a high voltage from the cable from the input side of the transformer, and wherein the wind turbines are joined to the electrical substation of the wind turbine comprising an integrated electrical substation.

13. The floating offshore wind farm according to claim 12, wherein fewer than five wind turbines-are interconnected to form the strand.

14. The floating offshore wind farm according to claim 12, wherein only so many wind turbines are joined to the electrical substation such that all of the energy can be transmitted to mainland via just one high-voltage export cable.

* * * * *